United States Patent
Frenkel

(10) Patent No.: US 8,507,596 B2
(45) Date of Patent: Aug. 13, 2013

(54) BIO-BASED PLASTICIZER

(75) Inventor: Peter Frenkel, Danbury, CT (US)

(73) Assignee: Galata Chemicals LLC, Southbury, CT (US)

( * ) Notice: Subject to any disclaimer, the term of this patent is extended or adjusted under 35 U.S.C. 154(b) by 0 days.

(21) Appl. No.: 13/360,762

(22) Filed: Jan. 29, 2012

(65) Prior Publication Data

US 2012/0214920 A1    Aug. 23, 2012

Related U.S. Application Data

(60) Provisional application No. 61/444,511, filed on Feb. 18, 2011.

(51) Int. Cl.
     *C08K 5/00*      (2006.01)

(52) U.S. Cl.
     USPC ........................................... 524/312

(58) Field of Classification Search
     USPC ........................................... 524/312
     See application file for complete search history.

(56) References Cited

U.S. PATENT DOCUMENTS

| | | | |
|---|---|---|---|
| 2,559,177 | A | 7/1951 | Terry et al. |
| 2,895,966 | A | 7/1959 | Ault et al. |
| 3,049,504 | A | 8/1962 | Daniel et al. |
| 4,000,100 | A | 12/1976 | Baldyga |
| 4,486,561 | A | 12/1984 | Chung et al. |
| 4,574,103 | A | 3/1986 | Stamper et al. |
| 4,590,233 | A | 5/1986 | Erwied et al. |
| 4,603,074 | A | 7/1986 | Pate et al. |
| 4,957,649 | A * | 9/1990 | Ripple et al. .................. 508/237 |
| 4,963,608 | A | 10/1990 | Kunieda et al. |
| 5,075,046 | A | 12/1991 | Stoll |
| 6,326,518 | B1 | 12/2001 | Duvall et al. |
| 6,734,241 | B1 | 5/2004 | Nielsen et al. |
| 6,797,753 | B2 | 9/2004 | Benecke et al. |
| 6,949,597 | B2 | 9/2005 | Nielsen et al. |
| 7,071,343 | B2 | 7/2006 | Daute et al. |
| 8,070,833 | B2 | 12/2011 | Murphy |
| 2004/0106812 | A1 | 6/2004 | Daute et al. |
| 2010/0010126 | A1 | 1/2010 | Ruschel et al. |
| 2010/0010127 | A1 | 1/2010 | Barki et al. |

FOREIGN PATENT DOCUMENTS

| | | |
|---|---|---|
| DE | 4433958 | 3/1996 |
| WO | 93/20135 | 10/1993 |
| WO | 2009102592 | 8/2009 |
| WO | 2009138508 | 11/2009 |
| WO | WO 2011021107 A2 * | 2/2011 |

OTHER PUBLICATIONS

Bailey's Industrial Oil and Fat Products, vol. 2, 4th edition, ed. D. Swern, John Wiley & Sons, 1982.
S. Sinadinovic-Fiser, M. Jankovic and Z.S. Petrovic; J. Am. Chem. Oil Soc., vol. 78, No. 7 (2001).
Ullmann's Encyclopedia of Industrial Chemistry, 5th edition, vol. A16 (1985), pp. 361.
Plastics Additives Handbook; R. Gächter and H. Müller, Carl Hanser Verlag, 4th edition, 1990.
PVC Technology, W.V. Titow; 4th edition, Elsevier Publishers, 1984, pp. 165-170.
Handbook of PVC Formulating, E.J. Wickson; John Wiley & Sons, 1993, pp. 393-449.
Bailey's Industrial Oil and Fat Products, vol. 2, 4th edition, ed. D. Swern, John Wiley & Sons, 1982, pp. 114-157.
S. Sinadinovic-Fiser, M. Jankovic and Z.S. Petrovic; J. Amer. Oil Chem. Soc., vol. 78, No. 7 (2001), pp. 725-731.
Plastics Additives Handbook; R. Gächter and H. Müller, Carl Hanser Verlag, 4th edition, 1990, pp. 327-334; 566-591; 593-635.
Handbook of PVC Formulating, E.J. Wickson; John Wiley & Sons, 1993, pp. 393-429.

* cited by examiner

*Primary Examiner* — Ling Choi
*Assistant Examiner* — Lanee Reuther
(74) *Attorney, Agent, or Firm* — Dilworth IP LLC

(57) ABSTRACT

A plasticizer composition comprising vicinally diacylated fatty acid esters derived from renewable feedstocks, and a process for the preparation thereof, are disclosed. A composition comprising a halogen-containing polymer and a plasticizer composition comprising the vicinally diacylated fatty acid esters is also described. A method for plasticizing halogen-containing polymers, such as polyvinyl chloride (PVC) resins is provided. The plasticizer compositions may be added to PVC resins in amounts ranging between 1 and 200 phr.

20 Claims, No Drawings

BIO-BASED PLASTICIZER

CROSS REFERENCE TO RELATED APPLICATIONS

This application claims the benefit of U.S. provisional application No. 61/444,511, filed Feb. 18, 2011, which is incorporated herein by reference in its entirety.

FIELD OF THE INVENTION

The present invention relates to plasticizers prepared from renewable feedstock suitable for plasticizing halogen-containing polymers, such as polyvinyl chloride (PVC) polymers.

BACKGROUND OF THE INVENTION

Plasticizers are commonly formulated into polyvinyl chloride (PVC) in order to transform rigid PVC resin into processable flexible PVC articles. Esters of phthalic acid (phthalates) are used as primary plasticizers that are incorporated at about 10-60 parts per hundred into PVC resin (phr). Epoxidized vegetable oils, such as epoxidized soybean oil (ESBO), are used as secondary plasticizers for PVC. ESBO can only be added to the PVC formulations in small amounts as its high molecular weight leads to incompatibility with PVC and unacceptably high migration of the plasticizer out of the PVC matrix. This behavior does not allow epoxidized vegetable oil to be used as a primary plasticizer for PVC. For example, ESBO cannot be added at loadings greater than about 7-10 phr. As such, the incorporation of an additional, more PVC-compatible bio-based plasticizer with the ESBO is generally desirable.

Bio-based plasticizers derived from fatty acids that contain epoxy functional groups are known in the art, as referred to hereinbelow.

U.S. Pat. No. 2,559,177 relates to plasticized polyvinyl resin compositions.

U.S. Pat. No. 2,895,966 describes plasticizer stabilizers for synthetic resins and compositions comprising said plasticizer stabilizers.

U.S. Pat. No. 3,049,504 relates to plasticizer stabilizers for synthetic resins.

U.S. Pat. No. 4,486,561 refers to improved injection moldability of polyethylene terephthalates which is achieved by the addition of an epoxidized plasticizer and a nucleating agent cooperative with the epoxidized plasticizer to achieve the improved moldability even when the composition is injection molded using mold temperatures of at least as low as 93° C.

U.S. Pat. No. 4,574,103 discloses a laminate comprising fused adherent layers of plastisol vinyl chloride polymer resins in which a first layer contains $Sb_2O_3$ and a second layer contains $TiO_2$. The flexible laminate is useful as a roofing membrane for the roof of a building wherein the layer containing the $Sb_2O_3$ is adjacent a structural or insulation member of the roof of the building while the $TiO_2$ layer can be exposed to the elements and can protect the $Sb_2O_3$ layer from sunlight.

U.S. Pat. No. 4,603,074 describes a compounded and plasticized vinyl chloride polymer layer, optionally supported such as with a fabric, contains an outer adherent and stain resistant layer having durability and flexibility comprising the cross-linked reaction product of a reactive polyester having free carboxylic acid groups and an alkylated benzoguanamine-, urea- or melamine-foimaldehyde resin. The vinyl chloride layer may be printed or embossed or both printed and embossed, optionally printed again, before the outer layer is applied.

U.S. Pat. No. 6,326,518 relates to halogen-containing polymer compositions comprising a latent mercaptan-containing heat stabilizer composition substantially free from the offensive odor typically associated with mercaptans are protected during processing by the degradation products of the latent (i.e., blocked) mercaptan which include a free mercaptan.

U.S. Pat. No. 6,797,753 discloses compositions and methods for plasticizing polyvinyl chloride polymers where the plasticizers contain fatty acids derived from vegetable oils and the fatty acids are substantially fully esterified with an alcohol (mono-ol or polyol), the fatty acids having unsaturated bonds that are substantially fully epoxidized, and wherein the fatty acids are added substantially randomly to one or more hydroxyl sites on the alcohol. The plasticizers may be added in amounts between about 10 to 230 phr of PVC resin.

WO2009102592 describes unhindered polyols used to react with an epoxidized soyate to make epoxidized soyate diester in the presence of a catalyst. The unhindered polyol can be 1,3-propanediol or any polyol having four or more carbon atoms with no two adjacent carbon atoms having hydroxyl functionality. A combination of catalysts is used to promote the transesterification reaction of the epoxidized soyate with the unhindered polyol to yield a high percentage of epoxidized soyate diester with epoxy functionality retained. The primary catalyst is a metallic hydroxide, and the secondary catalyst is a titanate. Bioderived epoxidized soyate diester plasticizers useful for thermoplastics and thermosets result.

Diesters of epoxidized fatty acids and epoxidized diglyceride acetates may show good plasticization and compatibility properties in PVC. However, despite their high epoxy content at high loadings, their incorporation into PVC formulations resulted in significantly reduced initial color-hold and mid-term heat stability of flexible PVC compounds.

U.S. Patent Application Publication No. 2010/0010126 and 2010/0010127 refer to the interesterification reaction between vegetal or animal oils as monoacid esters (preferentially with 1 to 12 carbons) and monoalcohol esters (preferentially with 1 to 12 carbons). The use of ethyl acetate is preferred as it is a product that may be obtained from ethanol (renewable) and has a boiling point (77° C.), which facilitates separation by vacuum distillation at the end of the reaction and its reuse. By varying the molar ratio between glycerol triester (oil or fat) and monoalcohol ester, different proportions of glycerol esters are obtained with 1 or 2 linked fatty acids and 1 or 2 linked acids of short chain, along with the formation of fatty acid ester and monoalcohol ester. After the distillation of excess residual ethyl acetate, products are obtained with viscosity from 21 to 33 cPs at 25° C., in the case of the reaction with soy oil.

Plasticizers based on acetylated fatty acids are known in the art. German Publication No. DE 4433958 teaches ring-opening products (I) of epoxidized fats, in which the free OH groups are converted into Zerevitinov-inactive forms by reaction with monofunctional carboxylic acids or functional derivatives thereof, -halides or esters of carbonic acid, -aldehydes or -ketones. Also claimed is a process for the production of (I) in which esterification is carried out by reaction with acetic acid and acetic anhydride in a multi-tray esterification column.

U.S. Pat. No. 5,075,046 describes vicinally diacyloxy-substituted compounds of the formulae (Ia), (Ib), Ic and (Id); $R^1[vic.(O—CO—R^2)_2]$—H (Ia); $R^3[vic.(O—CO—R^2)_2]$—CO—$OR^4$ (Ib); $R^3[vic.(O—CO—R^2)_2]$—CO—$OR^5[vic.(O—CO—R^2)_2]$ (Ic); $R^6$—CO—$OR^5[vic.(O—CO—R^2)_2]$ (Id), in which $R^1$ is a trivalent saturated $C_{6-22}$ hydrocarbon radical, $R^2$ is a $C_{1-3}$ alkyl radical, $R^3$ is a trivalent saturated C10-21 hydrocarbon radical, $R^4$ is a C1-22 alkyl radical, $R^5$ is a trivalent saturated C16-22 hydrocarbon radical, and $R^6$ is a C1-21 alkyl radical, are prepared from the corresponding epoxidized compounds by reaction with C2-4 carboxylic anhydrides at elevated temperature in the presence of catalytic quantities of carboxylic acids corresponding to the anhydrides and/or catalytic quantities of sulfuric acid.

U.S. Pat. Nos. 6,734,241 and 6,949,597 provide a composition comprising i) a thermoplastic polymer, ii) a compound having formula (I) wherein $R^1$, $R^2$ and $R^3$ are independently selected from an acyl group or a hydrogen atom, wherein at least one of $R^1$, $R^2$ and $R^3$ is an acyl group (a short acyl group) having from 2 to 6 carbon atoms, wherein at least one of $R^1$, $R^2$ and $R^3$ is a branched chain acyl group (a long acyl group) consisting of a saturated chain having 10 to 20 carbon atoms and a hydrophilic branch group.

U.S. Patent Application Publication No. 2004/0106812 describes an improved method for producing epoxidated glyceride acetates. The inventive method involves transesterifying epoxy fatty acid esters with triacetin.

PCT Publication No. WO 2009138508 relates to a method for preparing a composition containing at least one fatty acid ester, characterized in that the method comprises reacting a compound or a mixture of compounds having formula (II) with a carboxylic anhydride having formula (III) in the presence of a catalyst, said catalyst being selected from the group comprising the following catalysts: homogenous or heterogeneous quaternary ammoniums, heterogeneous acids, homogenous or heterogeneous bases, and mixtures thereof.

Notwithstanding the above literature, the need remains for improved bio-based compositions suitable for use as plasticizers in halogen-containing polymers, such as polyvinyl chloride (PVC) polymers, among other uses, as well as processes for the production of such bio-based compositions.

SUMMARY OF THE INVENTION

In a first aspect, the invention is directed to plasticizer compositions for plasticizing halogen-containing polymers comprising at least one vicinally diacylated fatty acid ester selected from the group consisting of:

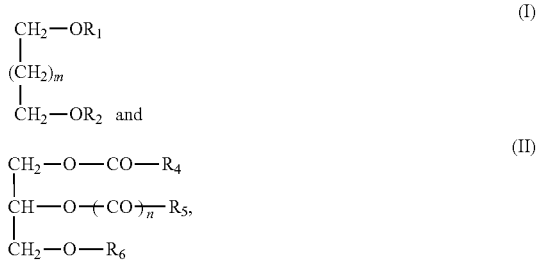

wherein $R_1$ and $R_2$ are independently selected from

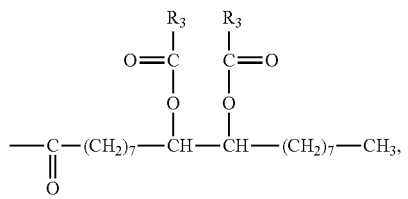

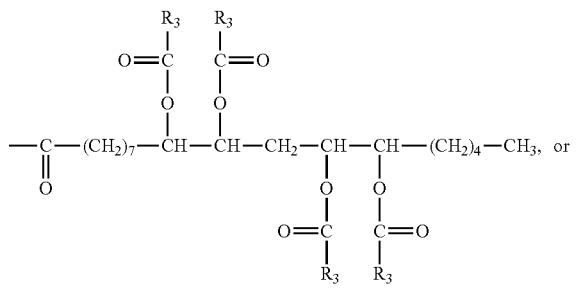

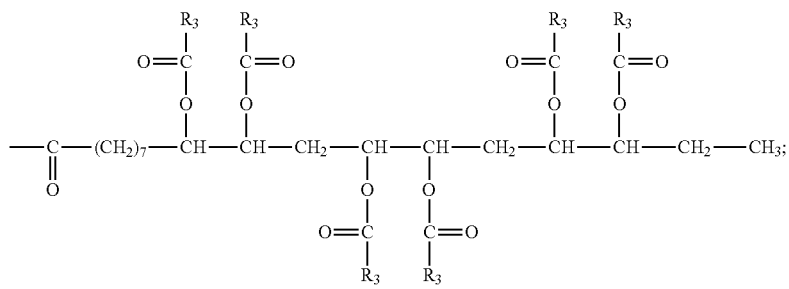

m is 0, 1, 2, 3 or 4;
$R_3$ and $R_4$ are independently selected from $C_1$-$C_8$ alkyl, phenyl, or phenyl substituted by $C_1$-$C_4$ alkyl;
n is 0 or 1;
if n is 1,
$R_5$ is defined as in $R_4$; or,
if n is 0,
$R_5$ is defined as in $R_1$; and
$R_6$ is defined as in $R_1$.

In a second aspect, the invention provides a process for preparing vicinally diacylated fatty acid esters of general formula (I):

wherein $R_1$ and $R_2$ are independently selected from

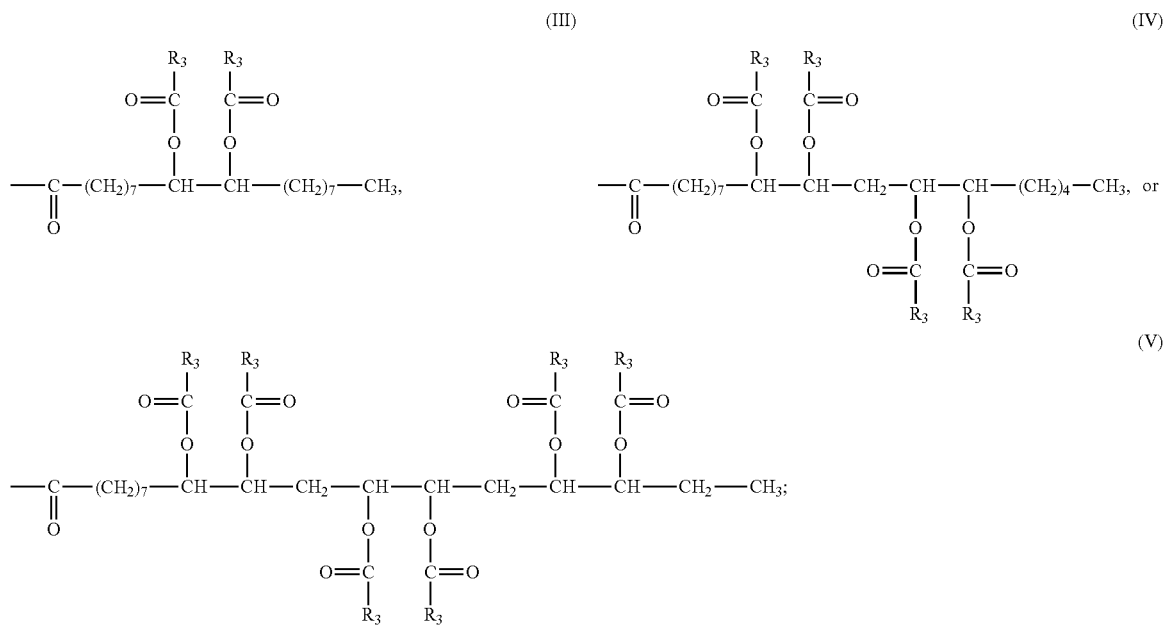

m is 0, 1, 2, 3 or 4; and $R_3$ is $C_1$-$C_8$ alkyl, phenyl, or phenyl substituted by $C_1$-$C_4$ alkyl;

the process comprising the steps of:

(i) transesterifying epoxidized monoester of fatty acid with diol to provide a composition comprising epoxidized fatty acid diester;

(ii) acylating the epoxidized fatty acid diester or the composition containing the same with anhydride.

In a third aspect, the invention is directed to a process for preparing vicinally diacylated fatty acid ester of general formula (I):

wherein $R_1$ and $R_2$ are independently selected from

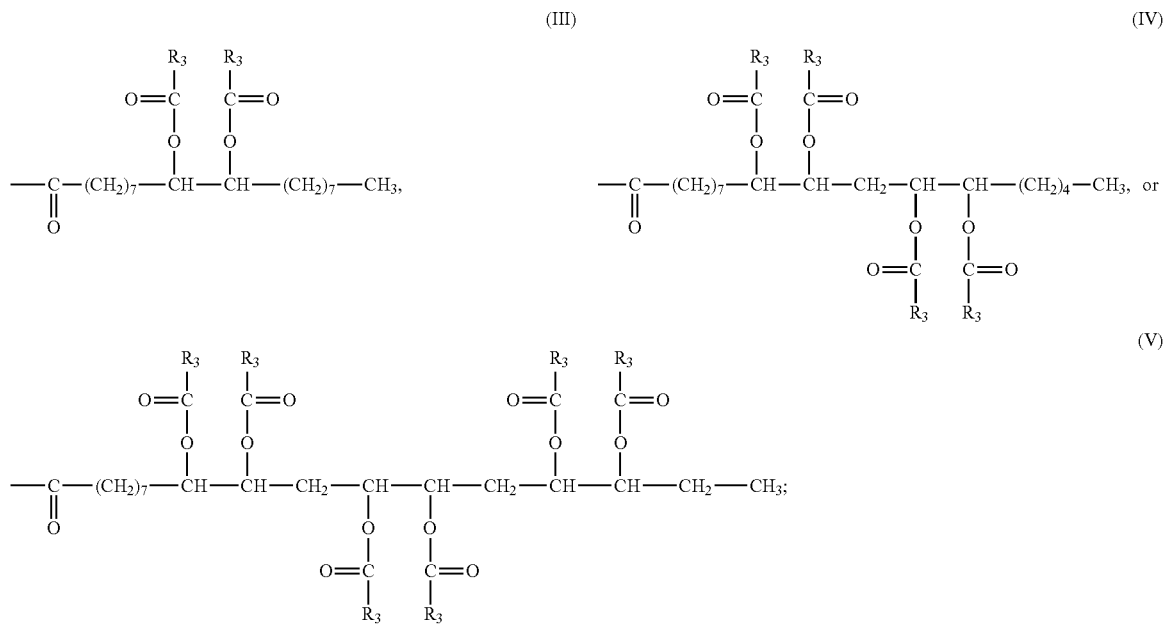

m is 0, 1, 2, 3 or 4; and $R_3$ is $C_1$-$C_8$ alkyl, phenyl, or phenyl substituted by $C_1$-$C_4$ alkyl;

the process comprising the steps of:

(i) esterifying fatty acid with diol to provide a composition comprising fatty acid diester;

(ii) epoxidizing the fatty acid diester or the composition containing the same to provide a composition comprising epoxidized fatty acid diester;

(iii) acylating the epoxidized fatty acid diester or the composition containing the same with anhydride.

In a fourth aspect, the invention provides a process for preparing vicinally diacylated fatty acid ester of general formula (II):

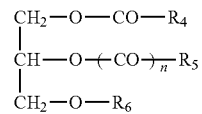

wherein n is 0 or 1; and,
if n is 0,
$R_5$ and $R_6$ are independently selected from

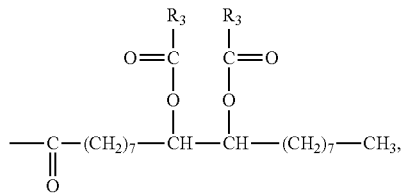

(III)

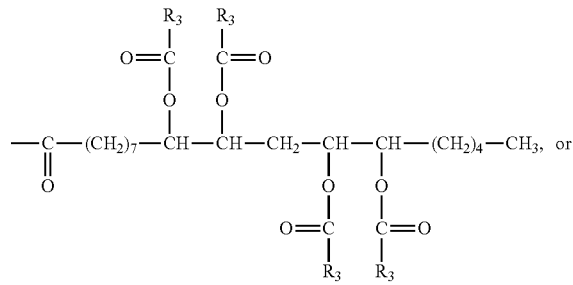

(IV)

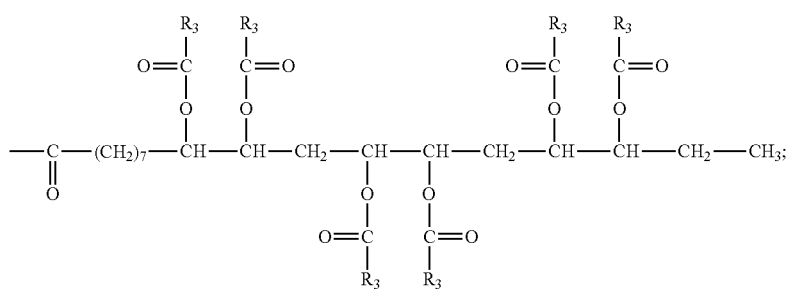

(V)

$R_3$ and $R_4$ are independently selected from $C_1$-$C_8$ alkyl, phenyl, or phenyl substituted by $C_1$-$C_4$ alkyl; and, if n is 1, $R_5$ is defined as in $R_4$, and $R_6$ is a radical of the formulae (III), (IV) or (V);

the process comprising the steps of:

(i) interesterifying epoxidized vegetable oil with triacetin to provide a composition comprising epoxidized fatty acid glyceride acetates;

(ii) acylating the epoxidized fatty acid glyceride acetates or the composition containing the same with anhydride.

In a fifth aspect, the invention is directed to a process for preparing vicinally diacylated fatty acid ester of general formula (II):

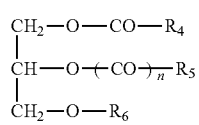
(II)

wherein n is 0 or 1; and,
if n is 0,
$R_5$ and $R_6$ are independently selected from

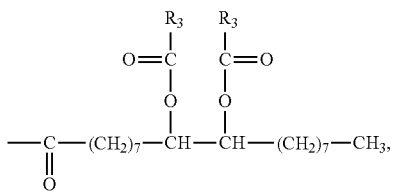
(III)

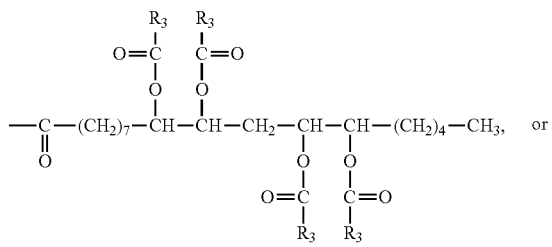
(IV)

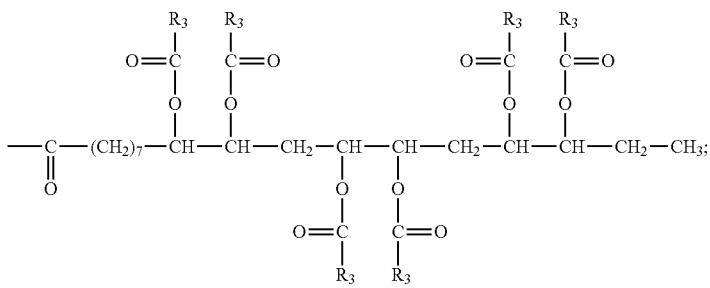
(V)

$R_3$ and $R_4$ are independently selected from $C_1$-$C_8$ alkyl, phenyl, or phenyl substituted by $C_1$-$C_4$ alkyl; and,
if n is 1,
$R_5$ is defined as in $R_4$, and
$R_6$ is a radical of the formulae (III), (IV) or (V);
the process comprising the steps of:
(i) interesterifying vegetable oil with triacetin to provide a composition comprising fatty acid glyceride acetate;
(ii) epoxidizing the fatty acid glyceride acetate or the composition containing the same to provide a composition comprising epoxidized fatty acid glyceride acetates;
(iii) acylating the epoxidized fatty acid glyceride acetates or the composition containing the same with anhydride.

In a sixth aspect, the invention provides a process for preparing vicinally diacylated fatty acid ester of general formula (II):

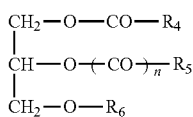
(II)

wherein n is 0 or 1; and,
if n is 0,
$R_5$ and $R_6$ are independently selected from (i) transesterifying vegetable oil with glycerol to provide a composition comprising fatty acid monoglycerides and fatty acid diglycerides;

(ii) esterifying the fatty acid monoglycerides and fatty acid diglycerides or the composition containing the same with acetic anhydride to provide a composition comprising fatty acid glyceride acetates;

(iii) epoxidizing the fatty acid glyceride acetates or the composition containing the same to provide a composition comprising epoxidized fatty acid glyceride acetates;

(iv) acylating the epoxidized fatty acid glyceride acetates or the composition containing the same with anhydride.

In a seventh aspect, the invention is directed to a process for preparing vicinally diacylated fatty acid ester of general formula (II):

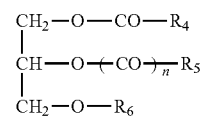
(II)

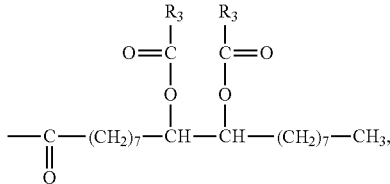
(III)

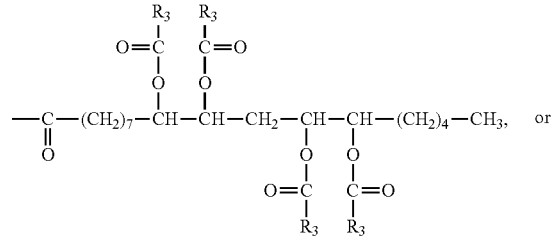
(IV)

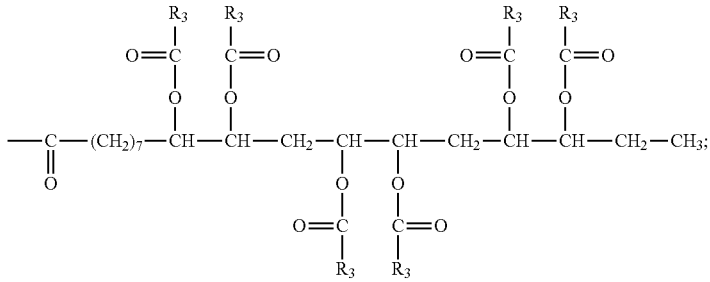
(V)

$R_3$ and $R_4$ are independently selected from $C_1$-$C_8$ alkyl, phenyl, or phenyl substituted by $C_1$-$C_4$ alkyl; and,
if n is 1,
$R_5$ is defined as in $R_4$, and
$R_6$ is a radical of the formula (III), (IV) or (V);
the process comprising the steps of:

wherein n is 0 or 1; and, if n is 0, $R_5$ and $R_6$ are independently selected from

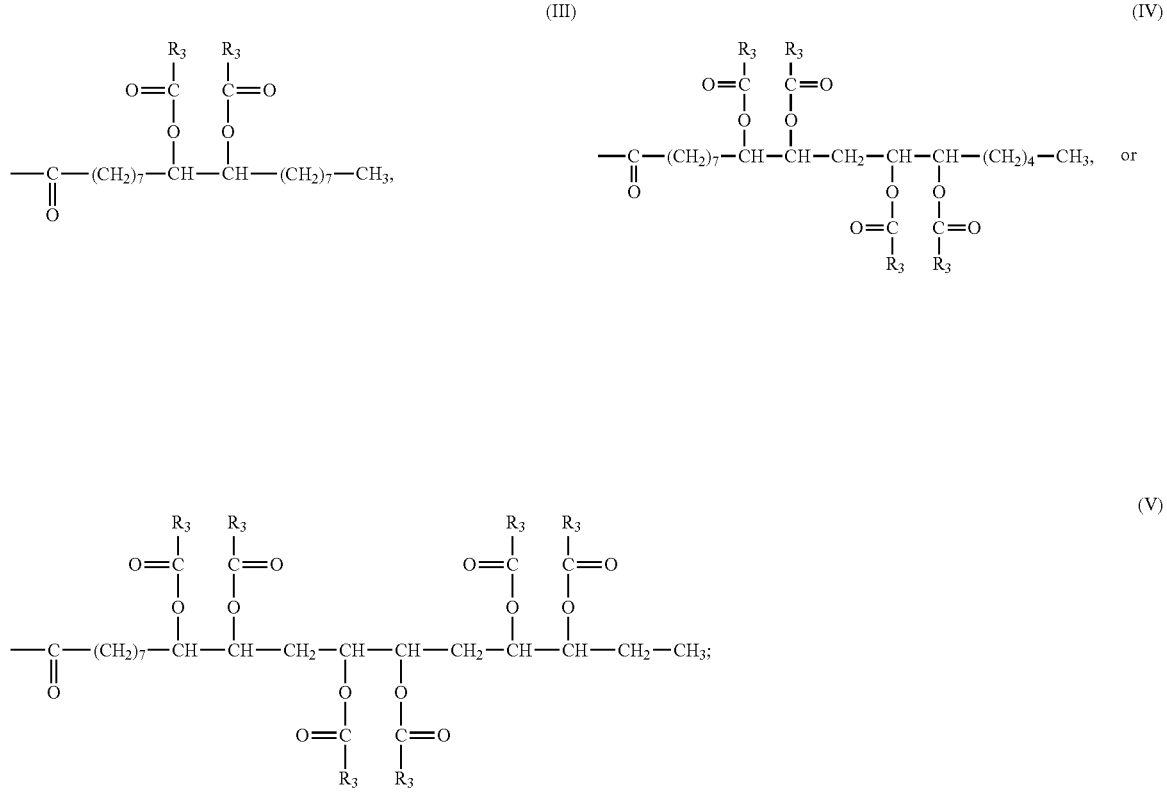

$R_3$ and $R_4$ are independently selected from $C_1$-$C_8$ alkyl, phenyl, or phenyl substituted by $C_1$-$C_4$ alkyl; and,
if n is 1,
$R_5$ is defined as in $R_4$, and
$R_6$ is a radical of the formulae (III), (IV) or (V);
the process comprising the steps of:
(i) esterifying fatty acid with glycerol to provide a composition comprising fatty acid monoglycerides and fatty acid diglycerides;
(ii) esterifying the fatty acid monoglycerides and fatty acid diglycerides or the composition containing the same with acetic anhydride to provide a composition comprising fatty acid glyceride acetates;
(iii) epoxidizing the fatty acid glyceride acetates or the composition containing the same to provide a composition comprising epoxidized fatty acid glyceride acetates;
(iv) acylating the epoxidized fatty acid glyceride acetates or the composition containing the same with anhydride.

In an eighth aspect, the invention provides a process for preparing vicinally diacylated fatty acid ester of general formla (II):

wherein n is 0 or 1; and,
if n is 0,
$R_5$ and $R_6$ are independently selected from

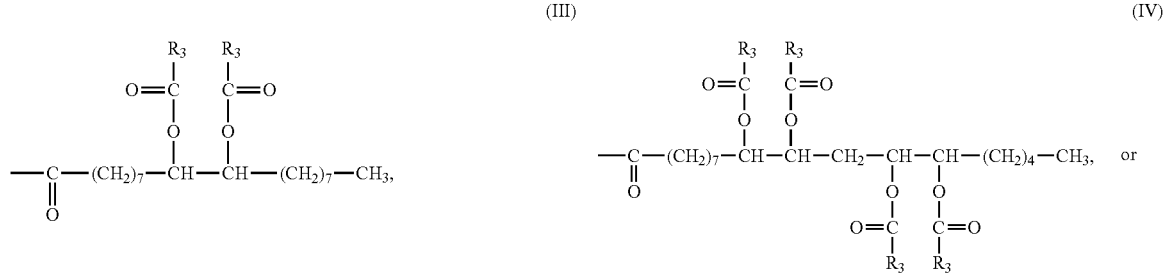

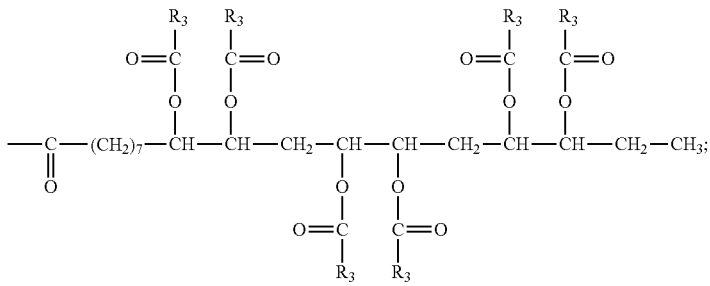
(V)

$R_3$ and $R_4$ are independently selected from $C_1$-$C_8$ alkyl, phenyl, or phenyl substituted by $C_1$-$C_4$ alkyl; and,
if n is 1,
$R_5$ is defined as in $R_4$, and
$R_6$ is a radical of the formulae (III), (IV) or (V);
the process comprising the steps of:
  (i) esterifying fatty acid with glycerol to provide a composition comprising fatty acid monoglycerides and fatty acid diglycerides;
  (ii) esterifying the fatty acid monoglycerides and fatty acid diglycerides or the composition containing the same with acetic anhydride to provide a composition comprising fatty acid glyceride acetates;
  (iii) epoxidizing and ring-opening the fatty acid glyceride acetates or the composition containing the same to provide a composition comprising hydroxy fatty acid glyceride acetates;
  (iv) acylating the hydroxy fatty acid glyceride acetates or the composition containing the same with anhydride.

In a ninth aspect, the invention is directed to a process for the production of vicinally diacetylated glycerol mono-oleate diacetate, the process comprising the steps of:
  (i) providing a composition comprising glycerol mono-oleate diacetate;
  (ii) epoxidizing the glycerol mono-oleate diacetate or the composition containing the same;
  (iii) acylating with acetic anhydride.

DETAILED DESCRIPTION OF THE INVENTION

The present invention relates to a plasticizer composition comprising vicinally diacylated fatty acid esters.

In some embodiments, the vicinally diacylated fatty acid esters of the invention are derived from vegetable oils. In one embodiment, the vicinally diacylated fatty acid ester of the invention may comprise fatty acids derived from vegetable oils.

Suitable vegetable oils include soybean oil, palm oil, olive oil, cotton seed oil, linseed oil, safflower oil, sunflower oil, canola oil, rapeseed oil, jatropha oil, algae oil, tall oil, corn oil, tung oil, or mixtures of any two or more thereof. Preferred are soybean oil and linseed oil. Soybean oil is more preferred.

In one embodiment, the vicinally diacylated fatty acid esters of the invention are derived from epoxidized vegetable oil. Suitable epoxidized vegetable oils include epoxidized soybean oil, epoxidized palm oil, epoxidized olive oil, epoxidized cotton seed oil, epoxidized linseed oil, epoxidized safflower oil, epoxidized sunflower oil, epoxidized canola oil, epoxidized rapeseed oil, epoxidized jatropha oil, epoxidized algae oil, epoxidized tall oil, epoxidized corn oil, epoxidized tung oil, or mixtures of any two or more thereof. Preferred are epoxidized soybean oil and epoxidized linseed oil. More preferred is epoxidized soybean oil.

In further embodiments, the vicinally diacylated fatty acid esters of the invention are derived from epoxidized fatty acids. Epoxidized fatty acids may be derived from epoxidized vegetable oils in accordance with the invention.

In one aspect, the invention provides vicinally diacylated fatty acid esters derived from diols. In one embodiment, the vicinally diacylated fatty acid esters comprise fatty acids that are substantially fully esterified with diols. In this aspect of the invention, vicinally diacylated fatty acid esters having general formula (I) are provided.

Exemplary diols employed in the substantially full esterification include, but are not limited to, ethylene glycol, 1,3-propanediol, propylene glycol, 1,4-butanediol, 1,6-hexanediol, and the like.

Substantially full esterification of the vicinally diacylated fatty acid esters with diols may result in vicinally diacylated fatty acid diesters, which the invention also provides. Exemplary vicinally diacylated fatty acid diesters include vicinally diacylated stearic acid diesters. Preferred are vicinally diacetylated stearic acid diesters. More preferred are vicinally diacetylated stearic acid diesters of diols such as ethylene glycol, 1,3-propanediol, propylene glycol, 1,4-butanediol, 1,6-hexanediol.

In one aspect, the invention provides vicinally diacylated fatty acid esters derived from glycerol acetates. In one embodiment, the vicinally diacylated fatty acid esters of the invention comprise fatty acids that are substantially fully esterified with glycerol acetates. In this aspect of the invention, vicinally diacylated fatty acid esters having general formula (II) are provided.

Suitable glycerol acetates are glycerol mono-acetate, glycerol di-acetate or mixtures thereof.

Substantially full esterification of vicinally diacylated fatty acid esters with glycerol acetates may form vicinally diacylated fatty acid glyceride acetates, which are also provided by the invention. Exemplary vicinally diacylated fatty acid glyceride acetates are vicinally diacylated fatty acid glyceride diacetates, vicinally diacylated fatty acid glyceride mono-acetates, or mixtures thereof. Preferred examples are vicinally diacetylated fatty acid monoglyceride diacetate, vicinally diacetylated fatty acid diglyceride mono-acetate, or mixtures thereof. More preferred are vicinally diacetylated stearic acid monoglyceride diacetate, vicinally diacetylated stearic acid diglyceride mono-acetate, or mixtures thereof.

As discussed above, the vicinally diacylated fatty acid esters of the invention may comprise fatty acids. Fatty acids may be saturated or comprise unsaturation, as provided by the invention. Suitable fatty acids comprising unsaturation are mono- or polyunsaturated fatty acids having 18 carbon atoms.

Examples of these include oleic acid, linoleic acid, linolenic acid, ricinoleic acid, dehydrated ricinoleic acid, and the like.

In one embodiment, the vicinally diacylated fatty acid esters of the invention comprise stearic acid.

In one aspect, the invention provides a process for making the vicinally diacylated fatty acid esters of the invention having general formula (I) or (II).

In one embodiment, the process for preparing the vicinally diacylated fatty acid esters having formula (I) includes transesterifying diols with epoxidized monoester fatty acids derived from vegetable oil to provide epoxidized fatty acid diesters and acylating epoxidized fatty acid diesters with anhydrides such as acetic anhydride. This process may be illustrated by the synthetic route given by way of example below:

Route A

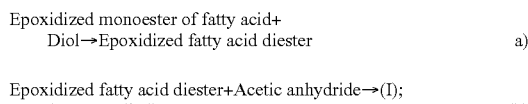

In one embodiment, the process for making the vicinally diacylated fatty acid esters having formula (I) includes esterifying fatty acids derived from vegetable oils with diols to provide fatty acid diesters, epoxidation of fatty acid diesters to provide epoxidized fatty acid diesters, and acylating epoxidized fatty acid diesters with anhydrides such as acetic anhydride. This process may be illustrated by the synthetic route given by way of example below:

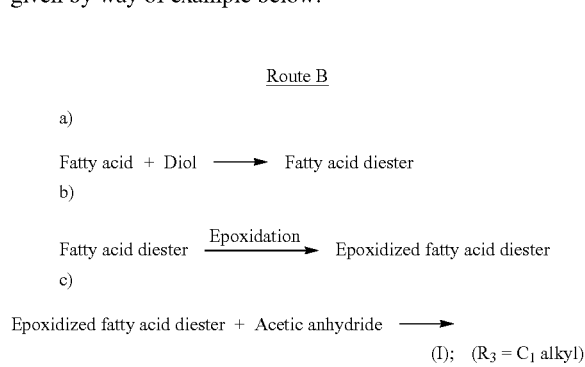

In one embodiment, the process for preparing the vicinally diacylated fatty acid esters having formula (II) includes interesterifying epoxidized vegetable oils with triacetin to provide epoxidized fatty acid glyceride acetates and acylating epoxidized glyceride acetates with anhydrides, e.g., acetic anhydride. This process may be illustrated by the synthetic route given by way of example below:

Route C

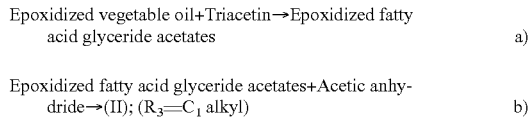

In other embodiments, the process for making the vicinally diacylated fatty acid esters having general formula (II) includes interesterifying vegetable oils with triacetin to provide fatty acid glyceride acetates, epoxidizing fatty acid glyceride acetates to provide epoxidized fatty acid glyceride acetates, and acylating epoxidized fatty acid glyceride acetates with anhydrides such as acetic anhydride. This process may be illustrated by the synthetic route given by way of example below:

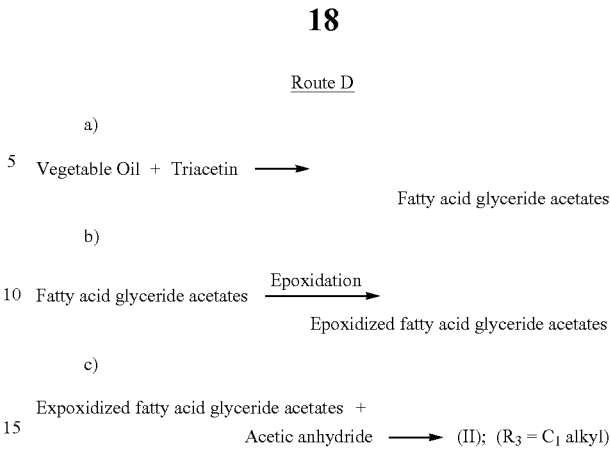

In further embodiments, the process for making the vicinally diacylated fatty acid esters having general formula (II) includes transesterifying vegetable oils with glycerol to provide fatty acid monoglycerides and fatty acid diglycerides, esterifying fatty acid monoglycerides and fatty acid diglycerides with acetic anhydride to provide fatty acid glyceride acetates, epoxidizing fatty acid glyceride acetates to provide epoxidized fatty acid glyceride acetates, and acylating epoxidized fatty acid glyceride acetates with anhydrides such as acetic anhydride. This process may be illustrated by the synthetic route given by way of example below:

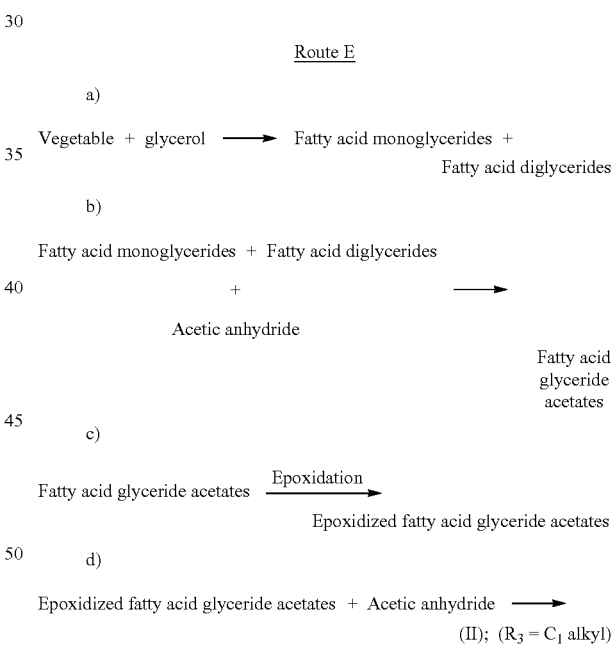

In other embodiments still, the process for making the vicinally diacylated fatty acid esters having general formula (II) includes esterifying fatty acids derived from vegetable oil with glycerol to provide fatty acid monoglycerides and fatty acid diglycerides, esterifying fatty acid monoglycerides and fatty acid diglycerides with acetic anhydride to provide fatty acid glyceride acetates, epoxidizing fatty acid glyceride acetates to provide epoxidized fatty acid glyceride acetates, and acylating epoxidized fatty acid glyceride acetates with anhydrides, for example, acetic anhydride. This process may be illustrated by the synthetic route given by way of example below:

Route F

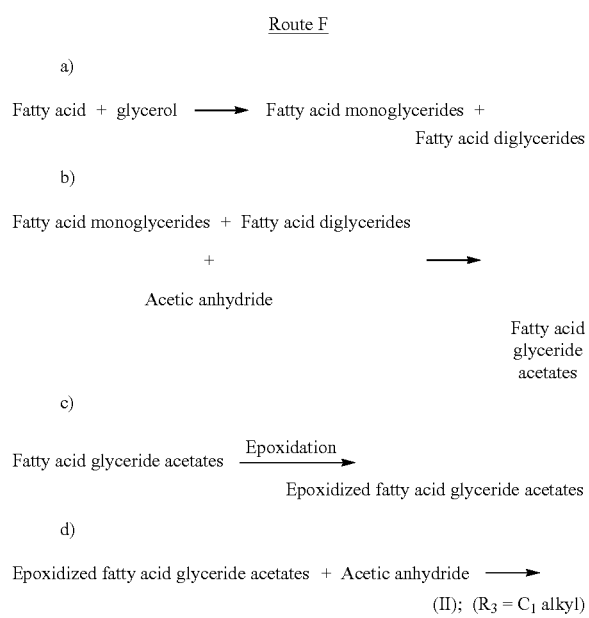

In one embodiment, the process for preparing the vicinally diacylated fatty acid esters having general formula (II) includes esterifying fatty acids derived from vegetable oil with glycerol to provide fatty acid monoglycerides and fatty acid diglycerides, esterifying fatty acid monoglycerides and fatty acid diglycerides with acetic anhydride to provide fatty acid glyceride acetates, epoxidizing and ring-opening fatty acid glyceride acetates to provide hydroxy fatty acid glyceride acetates, and acylating hydroxy fatty acid glyceride acetates with anhydrides such as acetic anhydride. This process may be illustrated by the synthetic route given by way of example below:

Route G

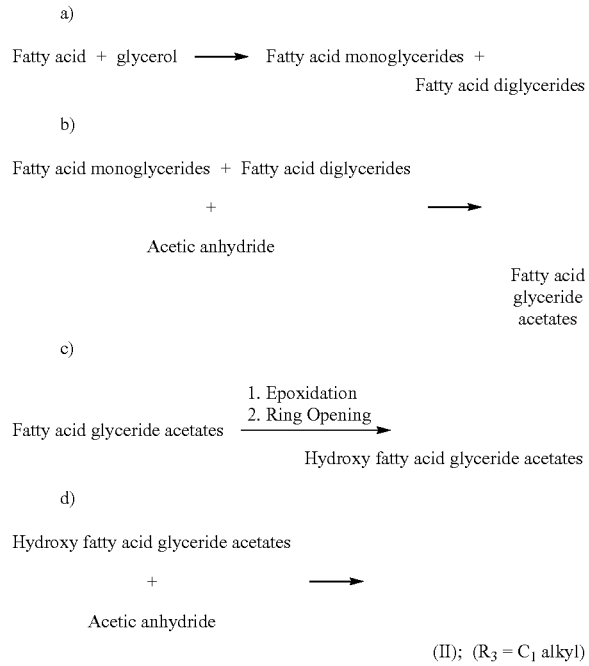

In additional embodiments, the invention is directed to product made by each of the above independent processes.

That is to say, product made by a process as illustrated in each of independent Routes A through G is provided by the invention. The invention further provides a method of plasticizing a halogen-containing polymer comprising adding an effective amount of product made by said processes to a halogen-containing polymer. In one embodiment, the invention also provides PVC articles comprising product made by said process(es).

In one embodiment still, the invention provides a process for the production of vicinally diacetylated glycerol mono-oleate diacetates, the process comprising the steps of (i) providing a composition comprising glycerol mono-oleate diacetate; (ii) epoxidizing the glycerol mono-oleate diacetate or the composition containing the same; and (iii) acylation with acetic anhydride.

Synthetic routes other than those discussed above would be appreciated by those skilled in the art.

As provided by the invention, acylation may involve use of anhydrides as acylating agents. Suitable anhydrides include those made by intermolecular dehydration of $C_1$-$C_8$ alkyl carboxylic acid, e.g., acetic, propionic, butanoic, pentanoic, hexanoic, heptanoic, octanoic, nonanoic acids, and the like, and isomers thereof. Other examples of suitable anhydrides are those made by intramolecular dehydration of saturated or unsaturated $C_1$-$C_8$ hydrocarbyl dicarboxylic acids, for example, succinic acid, maleic acid, and the like. Also included are anhydrides made by intramolecular dehydration of phthalic acid, $C_1$-$C_4$ alkyl phthalic acids, and the like, or isomers thereof. Further suitable anhydrides are those derived from ketene or polyanhydrides.

Preferred anhydrides are acetic, maleic, phthalic, or succinic anhydride, among which acetic anhydride is more preferred.

Acylating may further include use of catalysts. Exemplary catalysts include boron tri-fluoride ($BF_3$), sulfuric acid, quaternary ammonium salts, and the like.

Other acylating methods and reactions are well known to those skilled in the art.

Methods and reactions for esterifying, interesterifying, and transesterifying are well known to those skilled in the art. An overview of esterification, interesterification and transesterification is found at Bailey's Industrial Oil and Fat Products, Volume 2, Fourth edition, edited by D. Swern, John Wiley & Sons, 1982, which is incorporated herein by reference in its entirety.

Methods and reactions for epoxidizing are well known to those skilled in the art. An overview of epoxidation is found at S. Sinadinovic-Fiser, M. Jankovic, and Z. S. Petrovic; *Kinetics of in situ Epoxidation of Soybean Oil in Bulk Catalyzed by Ion Exchange Resin*, J. Am. Oil Chem. Soc., Vol. 78, No. 7 (2001), which is incorporated by reference herein in its entirety.

Methods and reactions for ring-opening are well known to those skilled in the art.

There are numerous other conventional methods that allow for the preparation of the plasticizer composition of the present invention which are incorporated by reference herein.

Triacetin is a commercially available product whose production methods are well known in the art. For example, triacetin may be produced by esterification reaction of glycerol with acetic acid and/or acetic anhydride. Triacetin is also known as 1,2,3-triacetoxy propane, CAS number 102-76-1.

The plasticizer compositions comprising the vicinally diacylated fatty acid esters of the invention may be used in halogen-containing polymers alone or in combination with conventional plasticizers. Optionally, the plasticizer compositions may be added to halogen-containing polymers together with known heat stabilizers or heat stabilizer components.

The terms "esterification", "transesterification", and "interesterification" as used herein are well understood in the art. Generally, and without being bound by specific theory, "esterification" may describe a reaction between an acid and an alcohol, whereby an ester is formed. "Transesterification" may describe a reaction between a first ester and an alcohol to form a second ester. "Interesterification" may describe a reaction between a first and a second ester, whereby a third ester is formed.

According to other embodiments, a method of plasticizing a halogen-containing polymer, as provided by the invention, comprises adding an effective amount of the plasticizer compositions of the present invention to the halogen-containing polymer. In one embodiment, the method comprises adding an effective amount of the plasticizer composition of the invention to a halogen containing polymer. An "effective amount" of a composition, as used herein, refers to an amount of the plasticizer compositions sufficient to exhibit a detectable plasticizing effect without undue detrimental effects (e.g., migration) when used in the manner of the invention.

Exemplary halogen-containing polymers include, but are not limited to, vinyl chloride, vinylidene chloride, vinyl resins whose structure contains vinyl chloride units, such as copolymers of vinyl chloride and vinyl esters of aliphatic acids, preferably vinyl acetate copolymers of vinyl chloride. Polyvinyl chloride (PVC) is preferred.

The plasticizer compositions of the present invention may exhibit low migration out of a PVC matrix. The plasticizer compositions may be added to PVC resins in amounts ranging between 1 and 200 phr, preferably in amounts ranging from 10 to 60 phr.

In one embodiment, the invention provides a method of reducing plasticizer migration from plasticized halogen-containing polymers comprising providing a halogen-containing polymer and adding an effective amount of the vicinally diacylated fatty acid esters of the invention to the halogen-containing polymer.

In some embodiments of the present invention, the plasticized formulations include one or more additives to enhance or modify one or more chemical or physical properties of the composition such as heat stability, lubricity, color, viscosity, among others. Exemplary additives include, but are not limited to, heat stabilizers, lubricants, viscosity control agents, UV absorbers, antioxidants, antistatic agents, antimicrobial and antifungal compounds, among other compounds conventionally used in flexible PVC formulations. Additionally, the plasticizer compositions of the invention can be used in combination with one or more conventional plasticizers. Suitable conventional plasticizers are discussed in Section VIII. below. In addition, a single additive can serve multiple purposes (e.g., a single additive can be a heat stabilizer and a lubricant, etc.). The additives used in combination with the plasticizer of the present invention in a halogen-containing polymer can be added in any amount suitable to achieve the desired purpose.

In various embodiments of the invention, use may be made of one or more of the following additives and/or mixtures thereof may be used with the plasticizer of the present invention in a halogen-containing polymer.

I. Polyols and Other Organic Components

Exemplary compounds of this type include sorbitol, triethanolamine, polyethylene glycols, β-diketones (dibenzoylmethane), and uracil, among others. Examples of the amounts of the polyols used are from 0.01 to 20 parts by weight, advantageously from 0.1 to 10 parts by weight and in particular from 0.1 to 5 parts by weight, based on 100 parts by weight of PVC.

II. Hydrotalcite Co-Stabilizers

The chemical composition of these compounds is known to one of ordinary skill in the art (see e.g., DE 3 843 581, U.S. Pat. No. 4,000,100, EP 0 062 813 and WO 93/20135, each of which is herein incorporated by reference in its entirety).

Compounds from the hydrotalcite series may be described by the following general formula

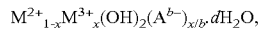

$$M^{2+}_{1-x}M^{3+}_{x}(OH)_2(A^{b-})_{x/b} \cdot dH_2O,$$

where $M^{2+}$=one or more of the metals selected from the group consisting of Mg, Ca, Sr, Zn and Sn, $M^{3+}$=Al or B, $A^n$ is an anion of valency n, b is a number from 1-2, $0 < x < 0.5$, and d is a number from 0-20.

Preference is given to compounds with $A^n$=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ or $HPO_4^{2-}$;

Examples of hydrotalcites include $Al_2O_3 \cdot 6MgO \cdot CO_2 \cdot 12H_2O$, $Mg_4 \cdot 5Al_2(OH)_{13} \cdot CO_3 \cdot 3.5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ and $ZnO \cdot 3MgO \cdot Al_2O_3 \cdot CO_2 \cdot 5-6H_2O$.

III. Metal Soap Stabilizers

Metal soaps are primarily metal carboxylates, preferably of relatively long-chain carboxylic acids. Well-known examples of these are stearates, oleates, palmitates, ricinolates, hydroxystearates, dihydroxy-stearates and laurates.

Exemplary metals include Na, K, Mg, Ca, Sr, Ba, Pb, Zn, Al, La, Ce and rare earth metals. Use is frequently made of so-called synergistic mixtures, such as barium/zinc stabilizers, magnesium/zinc stabilizers, calcium/zinc stabilizers or calcium/magnesium/zinc stabilizers. The metal soaps may be used either alone or in mixtures. An overview of common metal soaps is found in Ullmann's Encyclopedia of Industrial Chemistry, 5th Ed., Vol. A16 (1985), pp. 361 et seq, which is herein incorporated by reference in its entirety.

The metal soaps or mixtures of these may be used in amounts of, for example, 0.001 to 10 parts by weight, expediently 0.01 to 8 parts by weight, particularly preferably 0.05 to 5 parts by weight, based on 100 parts by weight of PVC.

IV. Alkali Metal and Alkaline Earth Metal Compounds

For the purposes of the present invention, examples of these materials include the carboxylates of the acids described above, but also corresponding oxides or, respectively, hydroxides or carbonates. Mixtures of these with organic acids are also possible. Examples include NaOH, KOH, CaO, Ca(OH)$_2$, MgO, Mg(OH)$_2$, BaO, Ba(OH)$_2$, Sr(OH)$_2$, Al(OH)$_3$, CaCO$_3$ and MgCO$_3$ (and also basic carbonates), and also selected salts of Na and of K, including perchlorates. In the case of alkaline earth carboxylates and Zn carboxylates it is also possible to use adducts of these as so-called "overbased" compounds. In addition to the stabilizers according to the invention it is preferable to use alkali alkaline earth metal carboxylates.

V. Organotin Stabilizers

Examples of possible compounds of this type include both mono- and dimethyl, butyl and octyltin mercaptides, maleates and the like.

VI. Phosphites (Triesters of Phosphorous Acid)

Organic phosphites are known co-stabilizers for chlorine-containing polymers. Examples of these are triphenyl phosphite, diphenyl isodecyl phosphite, ethylhexyl diphenyl phosphite, phenyl diisodecyl phosphite, trilauryl phosphite, triisononyl phosphite, triisodecyl phosphite, epoxy grade triphenyl phosphite, diphenyl phoshite, and tris(nonylphenyl) phosphite. Advantageous use may also be made of phosphites of various di- or polyols.

Examples of total amounts of the organic phosphites used, or of mixtures thereof, are from 0.01 to 10 parts by weight, advantageously from 0.05 to 5, and in particular from 0.1 to 3 parts by weight, based on 100 parts by weight of PVC.

VII. Lubricants

Examples of possible lubricants include fatty acids, fatty alcohols, montan wax, fatty acid esters, PE waxes, amide waxes, chloroparaffins, glycerol esters and alkaline earth metal soaps, and fatty ketones, and also the lubricants, or combinations of the lubricants, listed in EP0259783, which is herein incorporated by reference in its entirety. Stearic acid, stearic esters and calcium stearate are preferred.

VIII. Plasticizers

Examples of plasticizers used in some embodiments in combination with the glyceride acetate compositions of the present invention include those from the following groups and mixtures thereof:

A. Phthalate Plasticizers. Exemplary materials preferably include di-2-ethylhexyl, diisononyl and diisodecyl phthalate, also known by the common abbreviations DOP (dioctyl phthalate, di-2-ethylhexyl phthalate), DINP (diisononyl phthalate), and DIDP (diisodecyl phthalate).

B. Aliphatic Ester Plasticizers. Examples include esters of aliphatic dicarboxylic acids, in particular esters of adipic, azelaic or sebacic acid; preferably di-2-ethylhexyl adipate and diisooctyl adipate and esters of trimellitic acid, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl and tri-$C_9$-$C_{11}$-alkyl trimellitate. Common abbreviations are TOTM (trioctyl trimellitate, tri-2-ethylhexyl trimellitate), TIDTM (triisodecyl trimellitate) and TITDTM (triisotridecyl trimellitate).

C. Polymeric Plasticizers. Common starting materials for preparing polyester plasticizers include dicarboxylic acids, such as adipic, phthalic, azelaic or sebacic acid; diols, such as 1,2-propanediol, 1,3-butanediol, 1,4-butanediol, 1,6-hexanediol, neopentyl glycol and diethylene glycol.

D. Citric Acid Ester Plasticizers. A definition of these and other plasticizers and examples of the same are given in "Kunststoffadditive" ["Plastics Additives"], R. Gachter/H. Muller, Carl Hanser Verlag, 3rd Ed., 1989, Chapter 5.9.6, pp. 412-415, and in "PVC Technology", W. V. Titow, 4th Ed., Elsevier Publ., 1984, pp. 165-170, each of which is herein incorporated by reference in its entirety. It is also possible to use mixtures of different plasticizers along with the glyceride acetate compositions of the present invention.

E. Epoxidized Fatty Acid Esters and Other Epoxy Compounds Plasticizers. Exemplary materials include epoxidized esters of fatty acids from natural sources, such as epoxidized soybean oil, epoxidized linseed oil, rapeseed oil, epoxidized 2-ethylhexyl tallate, or epoxidized methyl soyate. However, it is also possible to use synthetic products, such as epoxidized butyl oleate. Use may also be made of epoxidized polybutadiene and polyisoprene, if desired also in a partially hydroxylated form, or of glycidyl acrylate and glycidyl methacrylate as homo- or copolymer.

These other plasticizers may be used in amounts of, for example, 5 to 40 parts by weight or 5 to 20 parts by weight, based on 100 parts by weight of PVC.

IX. Fillers

Fillers such as calcium carbonate, dolomite, wollastonite, magnesium oxide, magnesium hydroxide, silicates, china clay, talc, glass fibres, glass beads, wood flour, mica, metal oxides or metal hydroxides, carbon black, graphite, rock flour, heavy spar, glass fibres, talc, kaolin and chalk may be used in accordance with some embodiments of the present invention (see e.g., HANDBOOK OF PVC FORMULATING, E. J. Wickson, John Wiley & Sons, Inc., 1993, pp. 393-449; see also TASCHENBUCH der Kunststoffadditive [Plastics Additives Handbook], R. Gachter & H. Müller, Carl Hanser, 1990, pp. 549-615), each of which is herein incorporated by reference in its entirety.

The fillers may be used in amounts of preferably at least one part by weight, for example 1 to 20 parts by weight, expediently 1 to 10 parts by weight and in particular from 1 to 5 parts by weight, based on 100 parts by weight of PVC.

X. Pigments

Suitable substances are known to those of ordinary skill in the art. Examples of inorganic pigments include $TiO_2$, pigments based on zirconium oxide, $BaSO_4$, and zinc oxide (zinc white). Mixtures of various pigments may also be used. A definition and further descriptions are found in the "Handbook of PVC Formulating", E. J. Wickson, John Wiley & Sons, New York, 1993, which is herein incorporated by reference in its entirety.

XI. Antioxidants

Exemplary embodiments include alkylated monophenols, e.g., 2,6-di-tert-butyl-4-methylphenol, alkylthiomethylphenols, e.g., 2,4-dioctylthiomethyl-6-tert-butylphenol, alkylated hydroquinones, e.g., 2,6-di-tert-butyl-4-methoxyphenol, hydroxylated thiodiphenyl ethers, e.g., 2,2'-thiobis(6-tert-butyl-4-methylphenol), alkylidenebisphenols, e.g., 2,2'-methylenebis(6-tert-butyl-4-methylphenol), benzyl compounds, e.g., 3,5,3',5'-tetratert-butyl-4,4'-dihydroxydibenzyl ether, hydroxybenzylated malonates, e.g., dioctadecyl 2,2-bis(3,5-di-tert-butyl-2-hydroxybenzyl)malonate, hydroxybenzyl aromatics, e.g., 1,3,5-tris(3,5-di-tert-butyl-4-hydroxybenzyl)-2,4,6-trimethylbenzene, triazine compounds, e.g., 2,4-bisoctylmercapto-6-(3,5-di-tert-butyl-4-hydroxyanilino)-1,3,5-triazine, phosphonates and phosphonites, e.g., dimethyl 2,5-di-tert-butyl-4-hydroxybenzylphosphonate, acylaminophenols, e.g., 4-hydroxylauranilide, esters of beta-(3,5-ditert-butyl-4-hydroxyphenyepropionic acid, beta-(5-tert-butyl-4-hydroxy-3-methylphenyl) propionic acid, beta-(3,5-dicyclohexyl-4-hydroxyphenyepropionic acid, esters of 3,5-ditert-butyl-4-hydroxyphenylacetic acid with mono- or polyhydric alcohols, amides of beta-(3,5-ditert-butyl-4-hydroxyphenyl) propionic acid, such as, for example, N,N-bis(3,5-ditert-butyl-4-hydroxyphenyl-propionyl)hexamethylenediamine, vitamin E (tocopherol) and derivatives. Mixtures of the antioxidants may also be used.

Examples of the amounts of the antioxidants used are from 0.01 to 10 parts by weight, advantageously from 0.1 to 5 parts by weight and in particular from 0.1 to 3 parts by weight, based on 100 parts by weight of PVC.

XII. UV Absorbers and Light Stabilizers

Examples of UV absorbers and light stabilizers include 2-(2'-hydroxyphenyl)benzotriazoles, such as 2-(2'-hydroxy-5'-methylphenyl)-benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-ditert-butyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines, such as bis(2,2,6,6-tetramethylpiperidin-4-yl)sebacate, bis(2,2,6,6-tetramethylpiperidin-4-yl)succinate and the like. Mixtures of the UV absorbers and/or light stabilizers may also be used.

The plasticizer compositions of the present invention can be blended or formulated with one or more polymers, copolymers or plastics.

The amount of the plasticizer compositions of the invention incorporated into the halogenated polymer article may vary widely depending on the intended use of the plasticized formulation. In some exemplary embodiments, plasticized halogenated polymers (the formulations) comprise the plasticizer compositions, preferably comprising vicinally diacylated (e.g., diacetylated) fatty acid glyceride acetates, in an amount greater than 7 phr, e.g., greater than 10 phr, greater than 25 phr or greater than 35 phr. In terms of ranges, the plasticized formulations preferably comprise the plasticizer compositions, preferably comprising vicinally diacylated (e.g., diacetylated) fatty acid glyceride acetates, in an amount from 1 to 200 phr, e.g., from 10 to 60 phr.

The plasticizer compositions of the present invention exhibit excellent compatibility with and can be used as a primary plasticizer for PVC plastics at loadings greater than 10 phr. The plasticizer compositions of the present invention may exhibit lower migration out of PVC matrix than that of the conventional phthalate plasticizers. As such, the plasticizer compositions of the present invention can effectively be used as primary plasticizers in formulating flexible PVC articles.

Additional embodiments of the invention are directed to a method of plasticizing polyvinyl chloride (PVC) thermoplastic, wherein the method comprises the step of adding an effective amount of product prepared by a process of the present invention to PVC. As also provided by the invention, such step may result in lower migration out of flexible PVC matrix.

In one embodiment, the vicinally diacylated fatty acid esters of the invention are useful as lubricants, for example, in lubrication oil.

Further embodiments of the invention are directed to a method of making a plasticized halogen-containing polymer composition comprising the steps of providing the vicinally diacylated fatty acid esters of the invention, and adding said vicinally diacylated fatty acid esters to a halogenated polymer to provide a plasticized halogen-containing polymer composition.

In one embodiment, the invention provides PVC articles comprising the vicinally diacylated fatty acid esters of the invention.

EXAMPLES

In order that the invention disclosed herein may be more efficiently understood, the following examples are provided. These examples are for illustrative purposes only and are not to be construed as limiting the invention in any manner.

Example 1

Interesterification Step

To a two-liter four-necked round bottom flask fitted with a mechanical half-moon stirring paddle, stainless steel thermocouple attached to a J-KEM Scientific Ramp to Setpoint temperature controller, heating mantle, glass subsurface nitrogen tube, 20 mL Dean-Stark trap, Friedrich condenser, and 10% aqueous sodium hydroxide bubbler/trap was charged 680.0 g ESBO (Drapex® 6.8, marketed by Galata Chemicals, LLC) (0.6800 moles), 322.0 g triacetin (Sigma Aldrich) (1.476 moles) and 1.0 g dibutyltin dilaurate catalyst. Subsurface nitrogen-sparging commenced and the reactor was heated to 200° C., and was held there for 6 hours. The reaction was slowly cooled to ambient temperature. A product of amber color was obtained at quantitative yield. The product was characterized as follows: Hydroxyl number: 6 mg KOH/g; Acid value: 0.55 mg KOH/g; Viscosity: 0.16 Pa·s at 25° C.; Epoxy Value 4.66%.

Acylation Step

The vicinal diacetate product was obtained by reacting 456 g of the product prepared in the interesterification step with 204 g acetic anhydride either without a catalyst at 110° C. or in the presence of $BF_3$ (catalyst) at 70° C. over 4 hours. A product of yellowish color was obtained at high yield and characterized as follows: Hydroxyl number: 4.13 mg KOH/g; Acid value: 0.60 mg KOH/g; Viscosity at 25° C.: 0.16 Pa·as; Iodine Value 1.85.

Example 2

Esterification of Glycerol Mono-Oleate Step

Glycerol mono-oleate diacetate was prepared by reacting 356 g glycerol mono-oleate (usually produced by reacting oleic acid with glycerol; marketed by PMC Group as Kemester 2000) with 224 g acetic anhydride at 110° C. for 2 hours.

Epoxidation and Ring-Opening Step

To the above-prepared glycerol mono-oleate diacetate, 408 g acetic anhydride and 150 g of 34% hydrogen peroxide were added. The reaction temperature was maintained at about 40° C. Hydrogen peroxide reacts with acetic anhydride generating peracetic acid while water reacts with acetic anhydride and generates acetic acid in-situ. After 3 hours (after the epoxidation process is complete as measured by Iodine Value of less than 0.5%), the reaction temperature was raised to 70° C. to open the epoxy ring in the presence of acetic acid and form the vicinal hydroxylacetate product. The product was then washed with water to remove residual peracetic acid and dried under vacuum.

Acetylation of Hydroxy Groups Step

To the above-prepared hydroxyacetate, 204 g acetic anhydride was added. The acylation was carried out without catalyst; excess of acetic anhydride was removed under vacuum. The product of yellowish color was obtained at high yield (550 g) and characterized as follows: Hydroxyl number: 6.11 mg KOH/g; Acid value: 0.58 mg KOH/g; Viscosity at 25° C.: 0.18 Paas; Iodine Value 0.33.

Example 3

Flexible Polyvinyl Chloride (PVC) Sample Preparation

The tested formulations included the following: PVC resin Oxy-450 added at 100 phr; plasticizers: di-isononyl phthalate and tris-(2-ethylhexyl)-trimellitate (both were sourced from Sigma Aldrich) (DINP and TOTM—controls) and a control sample prepared in accordance with U.S. Pat. No. 7,071,343 added at 40 phr; epoxidized soybean oil (ESBO) added at 3 phr (except the formulation containing the prior art plasticizer of high epoxy content); a Ba/Zn-containing stabilizer Mark® 4781A (marketed by Galata Chemicals) and stearic acid were added to all formulations at 2.5 and 0.2 phr, respectively. The resultant sample formulations labeled as F1-F5 are summarized in Table 1.

The foregoing quantities are expressed in "phr", which stands for parts per hundred parts of PVC resin and indicates how many parts by weight of the particular substance are present in the PVC foimulation based on 100 parts by weight PVC.

TABLE 1

Tested Formulations

| Components | F1 | F2 | F3 | F4 | F5 |
|---|---|---|---|---|---|
| PVC resin | 100 | 100 | 100 | 100 | 100 |
| Ba/Zn stabilizer | 2.5 | 2.5 | 2.5 | 2.5 | 2.5 |
| Stearic Acid | 0.2 | 0.2 | 0.2 | 0.2 | 0.2 |
| DINP | 40 | | | | |
| TOTM | | 40 | | | |
| ESBO | 3 | 3 | | 3 | 3 |
| Prior Art | | | 40 | | |
| Sample of Example 1 | | | | 40 | |
| Sample of Example 2 | | | | | 40 |

For the conversion of the powder form of the PVC foimlation into a usable foam, a sheet was prepared under standardized conditions using a two-roll mill (Dr. Collin GmbH, Ebersberg, Germany). The gap between the rolls was about 0.5 mm; temperature of the rolls 165° C.; time for preparation and homogenization: 5 minutes; sheet thickness 0.5 mm. The PVC sheet was continuously moved from the two sides to the center and the enlargement thus obtained was distributed over the gap with a wooden spatula over the roll with intensive homogenization of all components.

Testing of Plasticized Polyvinyl Chloride (PVC)

A. Static Heat Stability 15 mm wide strips were cut from each milled sheet such that eight rectangular samples (15 mm×10 mm) from each sheet were produced. The samples were placed into the oven (Blue M Company, New Columbia, Pa., USA) set at 205° C. for thermal aging and were removed from the oven (one sample every ten minutes) over a period of 80 minutes.

Assessment of thermal stability of the flexible PVC formulations was carried out by the determining discoloration due to degradation. Yellowness Index (ASTM D 1925-70: Yellowness Index of Plastics) was measured and recorded for each sample using a microprocessor-controlled Hunterlab Labscan Spectro Colorimeter, Type 5100. The results of thermal stability assessment are summarized in Table 2. A lower number represents yellow color of lower intensity and, thus, improved static heat stability.

TABLE 2

Static Heat Stability Results

| Heat Exposure Time, Min. | F1 DINP (control) | F2 TOTM (control) | F3 Prior art (control) | F4 Sample from Example 1 | F5 Sample from Example 2 |
|---|---|---|---|---|---|
| 0 | 9.73 | 8.13 | 13.5 | 13.93 | 9.54 |
| 15 | 8.66 | 7.91 | 18.5 | 13.83 | 9.24 |
| 30 | 9.48 | 7.08 | 23.9 | 14.68 | 9.56 |
| 45 | 9.88 | 11.33 | 49.5 | 17.38 | 10.92 |
| 60 | 10.27 | 14.75 | 51.6 | 19.71 | 11.11 |
| 75 | 17.47 | 21.55 | 50.0 | 20.16 | 13.82 |
| 90 | 18.79 | 20.93 | 51.1 | 25.26 | 22.11 |
| 105 | 21.54 | 20.30 | 48.9 | 30.44 | 30.42 |
| 120 | 21.00 | 24.46 | 51.2 | 37.00 | 28.42 |
| 135 | 43.37 | Blackened | 52.0 | 46.00 | 34.98 |

The static heat stability results demonstrated that the plasticizer compositions of the present invention have an effect on mid-term heat stability (exposure time ranging from 45 to about 90 min.) of PVC formulations that is similar to that of phthalate controls but superior than that of prior art plasticizers (U.S. Pat. No. 7,071,343). As can be seen in Table 2, the bio-based plasticizer compositions of the present invention showed a better or comparable effect on long-term heat stability (at greater than 120 min. exposure time) of PVC formulations than both the conventional phthalates and the comparative epoxidized fatty acid ester-based plasticizer. Conversely, the control formulation containing the DINP/ESBO blend was completely blackened after 135 min. exposure time.

B. Shore A Hardness

The Shore A hardness of the formulations was determined in accordance with ASTM D2240, using a commercially available Durometer Type A hardness tester (Shore Instrument & Mfg Co, Jamaica, N.Y., USA). The results of the Shore A hardness characterization were measured in triplicates and Table 3 contains an average of the three readings. A lower number indicates a softer material.

TABLE 3

Shore A Hardness of Tested PVC Formulations

| Formulation | Plasticizer | Plasticizer Content, phr | Shore A |
|---|---|---|---|
| Formulation 1 - control | DINP | 40 | 85.5 |
| Formulation 2 - control | TOTM | 40 | 88.2 |
| Formulation 4 | Examp. 1 | 40 | 87.3 |
| Formulation 5 | Examp. 2 | 40 | 90.0 |

The data provided in Table 3 demonstrate that the Shore A hardness of the PVC formulations containing the esters of fatty acid vicinal diacetate plasticizers of the present invention was similar to that with the conventional phthalate plasticizers.

C. Migration

Migration of the plasticizers from the flexible PVC milled sheets (thickness of 0.5 mm) was measured by submersing weighted samples of known surface area in sunflower oil at ambient temperature for 14 days. Weight loss associated with migration of the plasticizers was calculated in $mg/dm^2$ upon removal of the samples from the oil, wiping off excess of oil, rinsing the samples with isopropanol to completely remove the oil from the surface, and air drying the samples. Weights were recorded using an analytical balance. The results were measured in triplicates. Table 4 contains an average of the three readings.

TABLE 4

| | Migration of plasticized PVC formulations | |
|---|---|---|
| Formulation | Plasticizer Amount, phr | Migration, mg/dm$^2$ |
| F1 | 40 | 146 |
| F4 | 40 | 33 |

The results show that the plasticizer compositions of the invention, when incorporated into the PVC, give significantly lower migration than the controls.

The present invention has now been described in considerable detail, also in reference to certain preferred aspects. Various modifications of the invention, in addition to those described herein, will be apparent to those skilled in the art. As such, the spirit and scope of the appended claims should not be limited to the description and the preferred versions contained within this specification.

What is claimed is:

1. A plasticizer composition for plasticizing halogen-containing polymers comprising at least one vicinally diacylated fatty acid ester selected from the group consisting of:

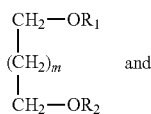
(I)

and

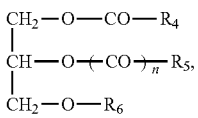
(II)

wherein $R_1$ and $R_2$ are independently selected from

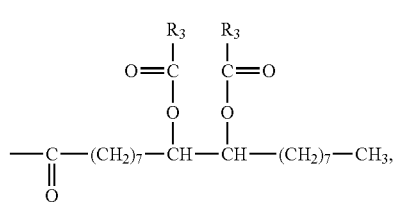
(III)

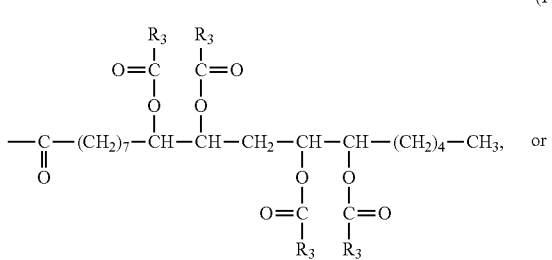
(IV)

or

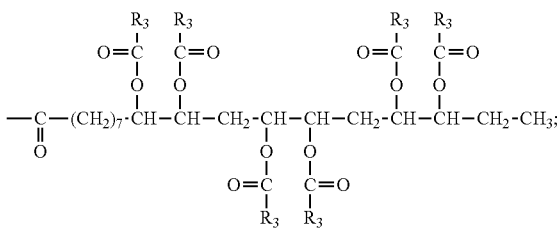
(V)

m is 0, 1, 2, 3 or 4;

$R_3$ and $R_4$ are independently selected from $C_1$-$C_8$ alkyl, phenyl, or phenyl substituted by $C_1$-$C_4$ alkyl;

n is 0;

$R_5$ is defined as in $R_1$; and $R_6$ is defined as in $R_1$.

2. The composition of claim 1, wherein at least one vicinally diacylated fatty acid ester is derived from diol.

3. The composition of claim 2, wherein the diol is selected from the group consisting of ethylene glycol, 1,3-propanediol, propylene glycol, 1,4-butanediol, and 1,6-hexanediol.

4. The composition of claim 1, wherein at least one vicinally diacylated fatty acid ester is or comprises vicinally diacetylated stearic acid diester.

5. The composition of claim 1, wherein said at least one vicinally diacylated fatty acid ester is derived from glycerol acetates selected from the group consisting of glycerol monoacetates and glycerol diacetates.

6. The composition of claim 1, wherein said at least one vicinally diacylated fatty acid ester is or comprises vicinally diacetylated stearic acid monoglyceride diacetate or vicinally diacetylated stearic acid diglyceride monoacetate.

7. The composition of claim 1, wherein at least one vicinally diacylated fatty acid ester is derived from vegetable oil.

8. The composition of claim 7, wherein the vegetable oil is selected from the group consisting of soybean oil, palm oil, olive oil, cotton seed oil, linseed oil, safflower oil, sunflower oil, canola oil, rapeseed oil, jatropha oil, algae oil, tall oil, corn oil, tung oil, and mixtures of any two or more thereof.

9. The composition of claim 1, wherein at least one vicinally diacylated fatty acid ester comprises fatty acid derived from vegetable oil.

10. The composition of claim 9, wherein the fatty acid derived from vegetable oil is selected from the group consisting of oleic acid, linoleic acid, and linolenic acid.

11. The composition of claim 1, wherein at least one vicinally diacylated fatty acid ester comprises stearic acid.

12. A lubricant comprising at least one vicinally diacylated fatty acid ester of claim 1.

13. The lubricant of claim 12, further comprising lubrication oil.

14. The lubricant of claim 12 wherein the vicinally diacylated fatty acid ester is diacylated with acylated agents selected from acetic anhydride, maleic anhydride, phthalic anhydride and mixtures thereof.

15. The lubricant of claim 14 wherein the acylated agent is acetic anhydride.

16. A process for preparing vicinally diacylated fatty acid ester of general formula (I):

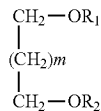
(I)

wherein $R_1$ and $R_2$ are independently selected from

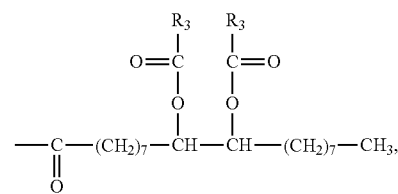
(III)

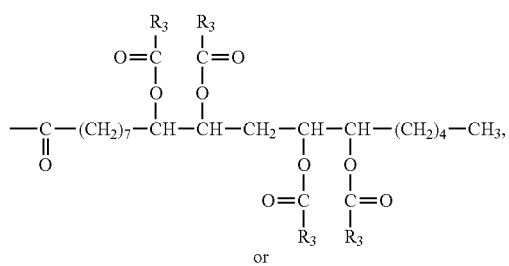
(IV)

or

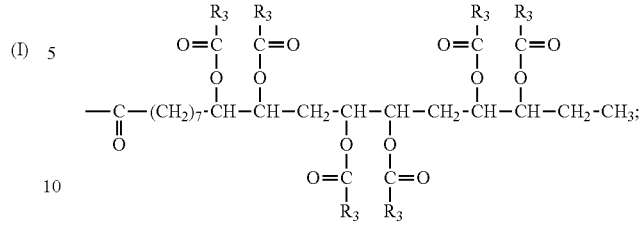
(V)

m is 0, 1, 2, 3 or 4; and
$R_3$ is $C_1$-$C_8$ alkyl, phenyl, or phenyl substituted by $C_1$-$C_4$ alkyl;
the process comprising the steps of:
(i) transesterifying epoxidized monoester of fatty acid with diol to provide a composition comprising epoxidized fatty acid diester;
(ii) acylating the epoxidized fatty acid diester or the composition containing the same with anhydride.

17. A product made by the process according to claim 16.

18. A plasticizer composition for plasticizing halogen-containing polymers comprising at least one vicinally diacylated fatty acid ester selected from esters of formula (I):

(I)

wherein $R_1$ and $R_2$ are independently selected from

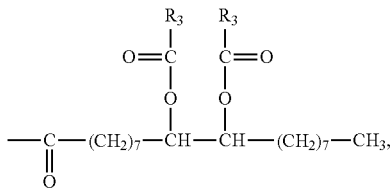
(III)

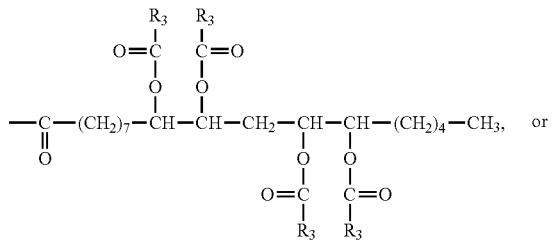
(IV)

or

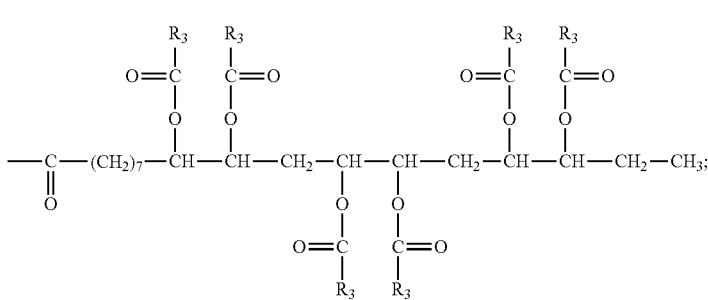
(V)

m is 0, 1, 2, 3 or 4; and $R_3$ is independently selected from $C_1$-$C_8$ alkyl, phenyl, or phenyl substituted by $C_1$-$C_4$ alkyl.

19. A plasticizer composition for plasticizing halogen-containing polymers comprising at least one vicinally diacylated fatty acid ester selected from the group consisting of:

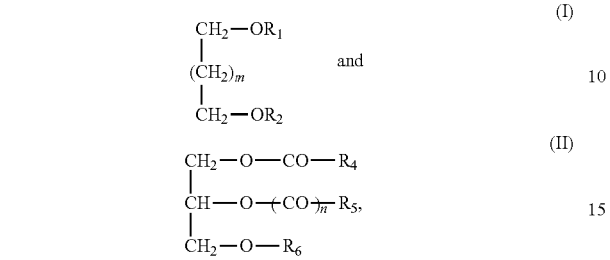

wherein $R_1$ and $R_2$ are independently selected from

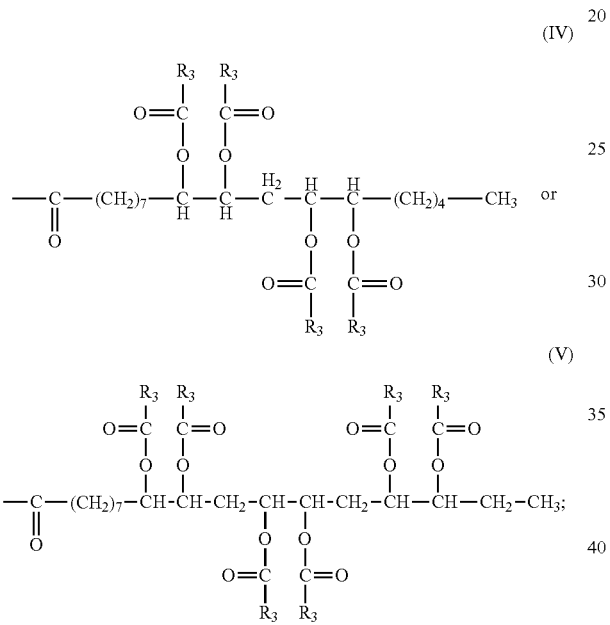

m is 0, 1, 2, 3 or 4;
$R_3$ and $R_4$ are independently selected from $C_1$-$C_8$ alkyl, phenyl, or phenyl substituted by $C_1$-$C_4$ alkyl;
n is 0 or 1;
if n is 1,
$R_5$ is defined as in $R_4$; or,
if n is 0,
$R_5$ is defined as in $R_1$; and
$R_6$ is defined as in $R_1$.

20. A plasticizer composition for plasticizing halogen-containing polymers comprising at least one vicinally diacylated fatty acid ester selected from the group consisting of:

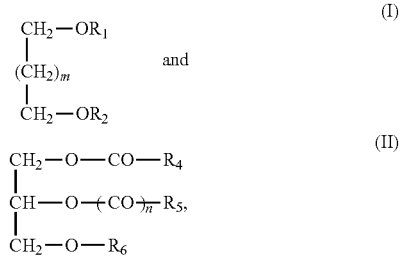

wherein $R_1$ and $R_2$ are independently selected from

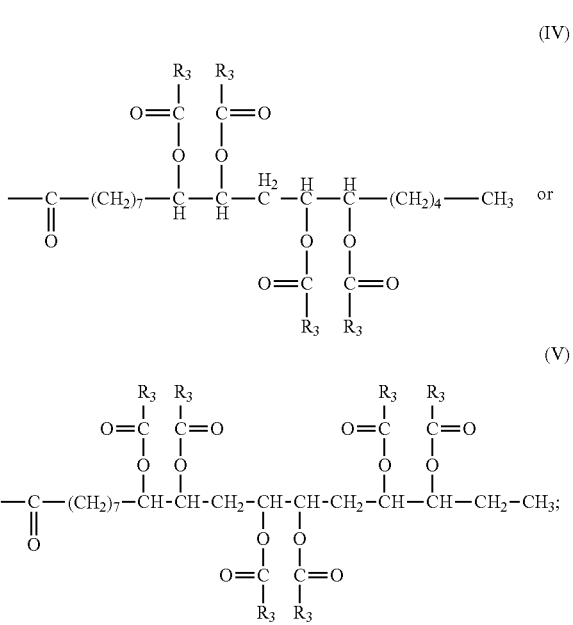

m is 0, 1, 2, 3 or 4;
$R_3$ and $R_4$ are independently selected from $C_1$-$C_8$ alkyl, phenyl, or phenyl substituted by $C_1$-$C_4$ alkyl;
n is 0;
$R_5$ is defined as in $R_1$; and
$R_6$ is defined as in $R_1$.

* * * * *